(12) United States Patent
Loguinov

(10) Patent No.: US 7,164,680 B2
(45) Date of Patent: Jan. 16, 2007

(54) SCHEME FOR SUPPORTING REAL-TIME PACKETIZATION AND RETRANSMISSION IN RATE-BASED STREAMING APPLICATIONS

(75) Inventor: Dmitri Loguinov, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1128 days.

(21) Appl. No.: 09/873,566

(22) Filed: Jun. 4, 2001

(65) Prior Publication Data

US 2002/0181506 A1 Dec. 5, 2002

(51) Int. Cl.
*H04L 12/28* (2006.01)

(52) U.S. Cl. .................. 370/394; 370/474

(58) Field of Classification Search ............ 370/389, 370/392, 394, 473, 474
See application file for complete search history.

(56) References Cited

U.S. PATENT DOCUMENTS

| | | | | |
|---|---|---|---|---|
| 5,222,061 A | * | 6/1993 | Doshi et al. | 370/394 |
| 5,519,704 A | * | 5/1996 | Farinacci et al. | 370/402 |
| 5,680,322 A | * | 10/1997 | Shinoda | 714/18 |
| 5,768,533 A | * | 6/1998 | Ran | 709/247 |
| 5,918,002 A | | 6/1999 | Klemets et al. | 395/182 |
| 6,032,180 A | * | 2/2000 | Nishikawa | 725/115 |
| 6,085,252 A | * | 7/2000 | Zhu et al. | 709/231 |
| 6,629,318 B1 | * | 9/2003 | Radha et al. | 725/134 |

OTHER PUBLICATIONS

C. Papadopoulos: "Error Control for Continous Media and Large-Scale Multicast Applications" Online, Aug. 1999, Dissertation Saint Louis, Missouri XP002213855.
P. Parnes: "RTP Extension for Scalable Reliable Multicast", Internet Draft, Online Nov. 20, 1996, XP002213854.

* cited by examiner

*Primary Examiner*—Huy D. Vu
*Assistant Examiner*—Christine Ng
(74) *Attorney, Agent, or Firm*—Larry Liberchuk

(57) ABSTRACT

Disclosed is a system and method for supporting real-time packetization of multimedia information and retransmission of lost multimedia packets over a packet network, and the method includes the steps of: packetizing multimedia bitstreams into a plurality of transmission packets according to a predetermined scheme; storing copies of the transmission packets for a predetermined time period; transmitting the transmission packets in sequence to the client; detecting lost packets; sending retransmission requests to the server upon detection of a lost packet; and, retransmitting copies of lost packets, which are stored in the server memory within a predetermined time period, to the client system.

17 Claims, 7 Drawing Sheets

STRUCTURE OF THE LINKED RETRANSMISSION LIST.

SCHEME FOR SUPPORTING REAL-TIME PACKETIZATION AND RETRANSMISSION IN RATE-BASED STREAMING APPLICATIONS

BACKGROUND OF THE INVENTION

1. Field of the Invention

The present invention relates to the field of transmitting a bitstream over a communication medium. More specifically, the invention relates to the real-time transmission of digital signals into transport protocol packets.

2. Description of the Invention

In order to transmit encoded digital data from one system over a communication medium to another requires carrying the bitstream as payload data within the payload section of transport protocol packets. This process of inserting data into another protocol's packet is known as "encapsulation" and involves "segmentation" of the bitstream at the source end into packets. Thereafter, the segmented bitstreams are reassembled at the receiving end. Thus, the encapsulation process allows multimedia data to transmit from one location to another over a packet network.

A Real-time Transport protocol (RTP) is typically used to transmit multimedia data on a network such as the Internet. The data is compressed using a specific compression technique and the compressed data stream is broken down into smaller packets for transmission over the communication medium. This process is referred to as "packetization" and the reverse process, i.e., assembling network packets into a continuous byte stream, is called "depacketization". One significant impediment to reliable multimedia streaming on packet data networks is packet loss. Packet loss occurs due to limited buffering and processing capabilities of network nodes, and to a lesser extent, due to bit errors in physical links. Referring to FIG. 1, many real-time applications employed over the Internet uses negative acknowledgment messages sent by the client to determine when a retransmission is required. As shown in FIG. 1, if packet loss occurs during transmission, the client in a streaming session sends a negative acknowledgment (NACK) in response to each lost packet. The NACK packet contains the sequence number of the packet that needs to be retransmitted by the server. As the data stream is typically prepacketized before the transmission, the server can always retrieve the necessary packet from storage (e.g., a file) and retransmit to the client.

FIG. 2 illustrates a conventional structure of a packetized stream used for retransmission. Using static header information, both the streaming header and packet data can be retrieved from one location inside the file. Here, knowing the offset $OFF_i$ of packet i within the corresponding file $FILE_j$ and the size $S_i$ of the packet, the server can easily retransmit packet i upon receiving a NACK for packet i. Therefore, the server needs to know only the three sets of related information ($FILE_i$, $OFF_i$, $S_i$) about each packet, which are often stored in a file called the meta-file of the session. However, in the event that the server implements real-time (i.e., on-the-fly) packetization of the multimedia stream, the support for retransmission becomes more difficult using this conventional method as each streaming header is static and does not change when the server transmits it to the client.

Real-time packetization is necessary, for example, if the server transmits data from a live source (i.e., live TV broadcast) or if the server needs to alter the stream in the middle of a transmission (i.e., adapt the size of each picture to the available bandwidth). In real-time packetization, the server arbitrarily decides the composition of each packet at the time of transmission; thus, the server has no way of reconstructing the header information from a sequence number contained in the received NACK from the client. Thus, if the conventional method is utilized in real-time packetization, the support for retransmission is unattainable as there exists no prior knowledge of header contents of each sent packet. Another disadvantage of the conventional method is that the server is usually forced to transmit packets whose size is less than the maximum packet size permitted in the underlying protocol. The consequence is wasted bandwidth from leaving portions of the packet payload unused.

Accordingly, there is a need to provide a more efficient method and apparatus for providing real-time packetization to transmit multimedia data streams with a lower overhead and to permit the retransmission of lost packets, while supporting real-time packetization.

SUMMARY OF THE INVENTION

The present invention relates to a method and system for supporting real-time packetization of multimedia information and retransmission of lost multimedia packets over a packet network.

Accordingly, the present invention provides a method for transmitting a multimedia bitstream in real-time between a server and a client and performs the following steps: packetizing multimedia bitstrems into a plurality of transmission packets according to a predetermined scheme; storing copies of the transmission packets for a predetermined time period; transmitting the transmission packets in sequence to the client; sending retransmission requests to the server upon detection of a lost packet; and, retransmitting copies of lost packets to the client system.

BRIEF DESCRIPTION OF THE DRAWINGS

A more complete understanding of the method and system of the present invention is available by reference to the following detailed description when taken in conjunction with the accompanying drawings wherein.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. Moreover, for the purpose of clarity, detailed descriptions of well-known devices, circuits, and methods are omitted so as not to obscure the description of the present invention with unnecessary detail.

Figure 1:
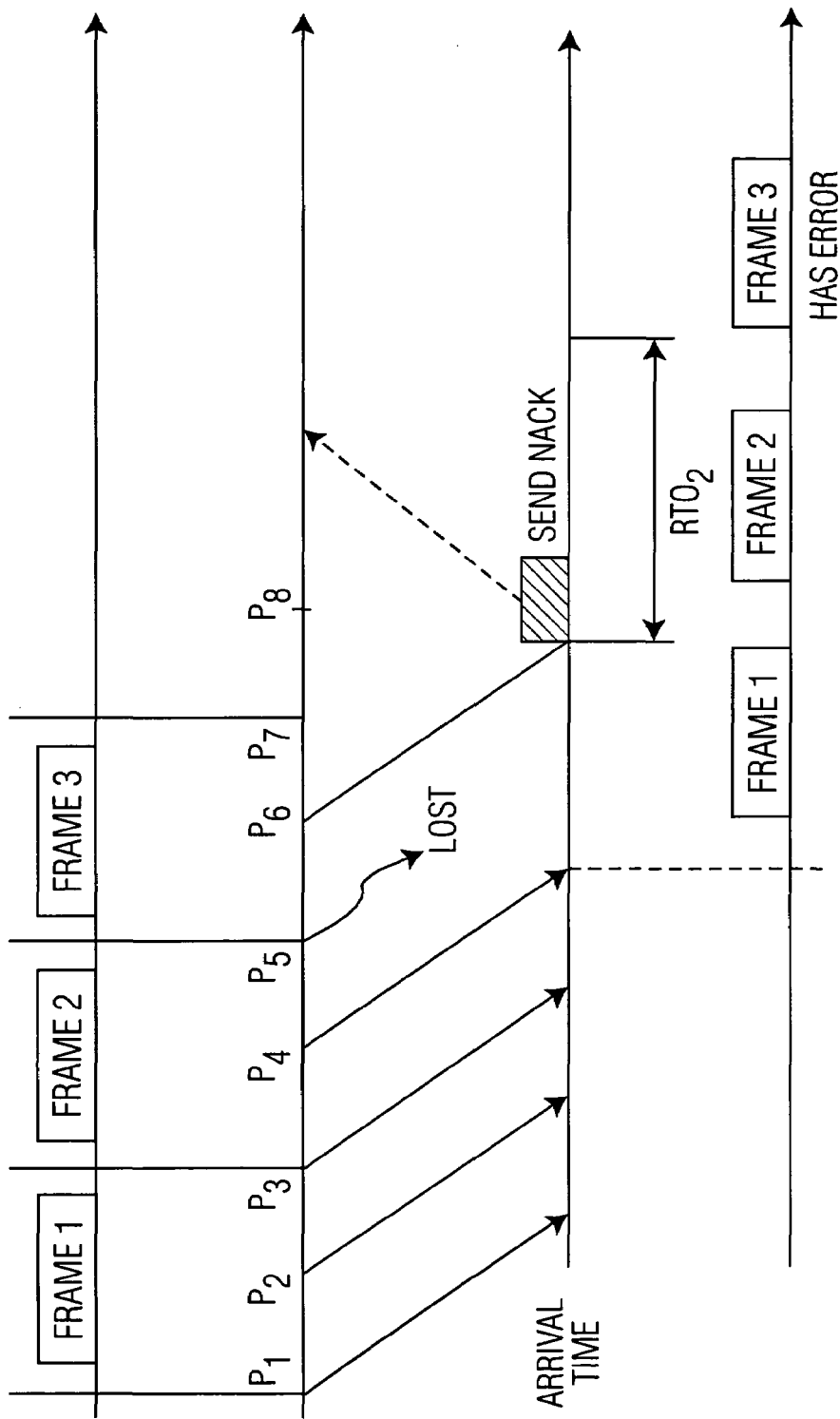
FIG. 1 illustrates data flows in the UDP communication environment.
Figure 2:
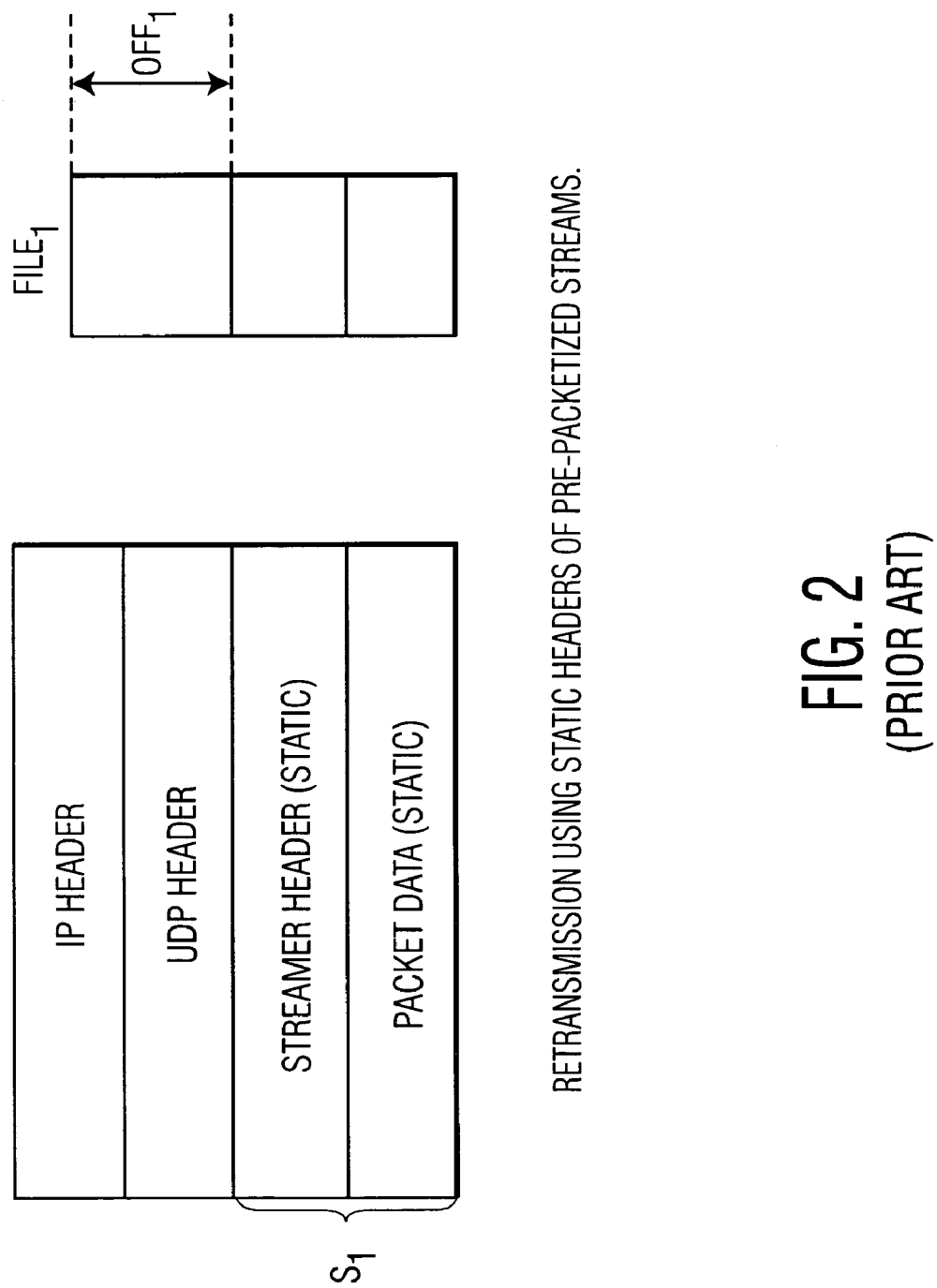
FIG. 2 illustrates headers of pre-packetized streams according to a conventional method.
Figure 3:
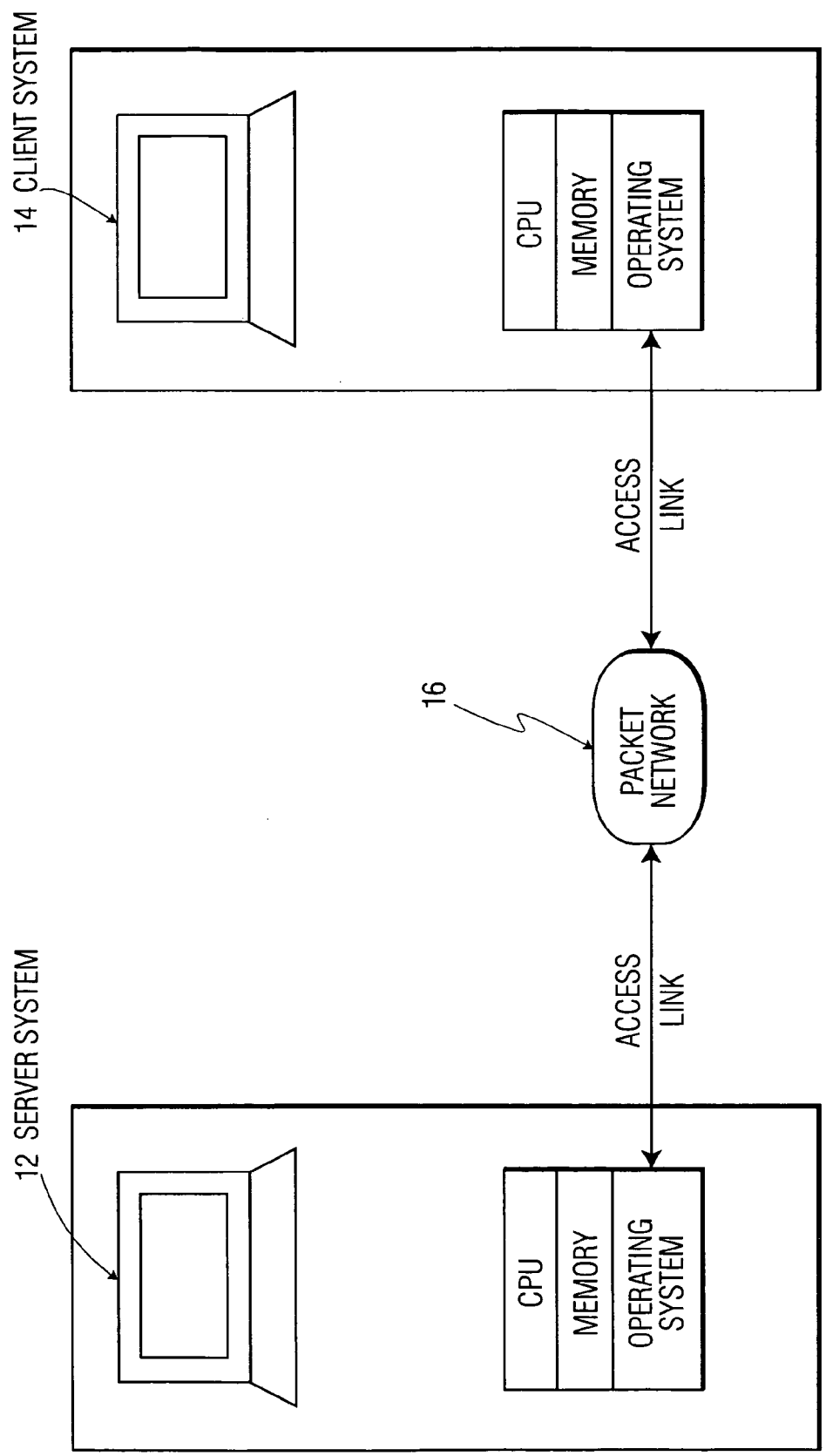
FIG. 3 illustrates the relationship of a server and a client over a packet network according to the present invention.

Referring to FIG. 3, according to the embodiment of the present invention, a multimedia file is transmitted in packets, each packet having at least a header and an information field, from a server 12 to a client 14 over a packet network 16. To achieve this, real-time packetization is performed with each transmitted packet with a header that is created by the server 12 at the time of transmission. Depending on the specific protocol in use, a packet may be of fixed or variable length. The rate of streaming from the server 12 may be controlled by the client 14 based at least on a predetermined bandwidth budget at the server 12 and an estimated information loss rate on the packet network 16.

Figure 4:
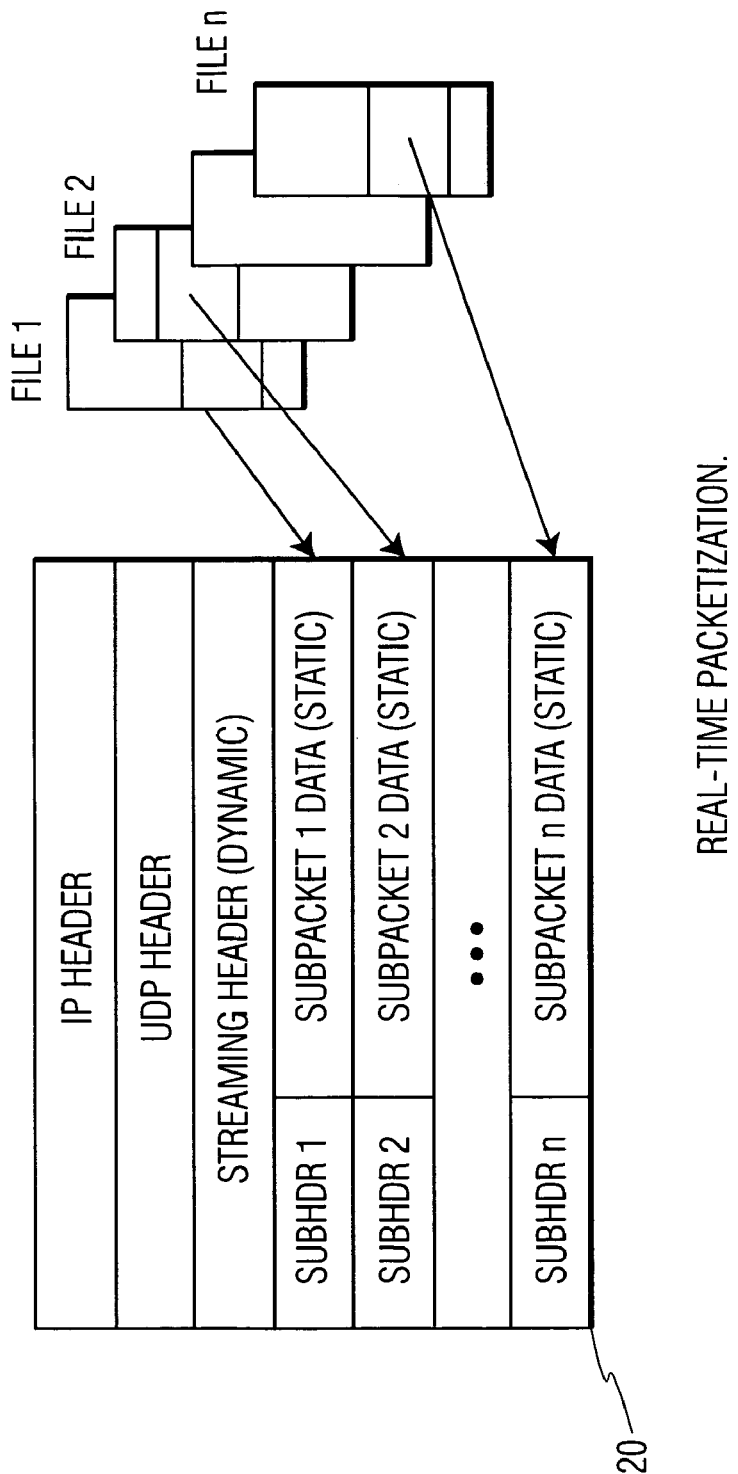
FIG. 4 illustrates the format of real-time packetization according to the present invention.

FIG. 4 illustrates a real-time packet 20 constructed by the server 12 at the time of transmission according to the embodiment of the present invention. The real-time packet 20 includes several objects, object layers, or several frames as part of one packet. The composition of each packet 20 is performed dynamically by the server at the time of transmission. That is, the server 12 decides how many and which objects, layers, or frames it will insert into any given packet as well as what percentage of each frame should be inserted at the time of transmission. In addition, data from each object, layer, or frame (collectively called subpackets) may contain their own subheader within the packet 20, and different subpackets of a packet may come from different files at the time of transmission in accordance with the present invention. It should be noted that although real-time packetization complicates the structure of each packet, it allows the server 12 to transmit live streams, adjust the sending rate in accordance with a congestion control scheme, and fill each packet to the maximum allowed size. As a consequence of filling each packet to the maximum, a lower bandwidth overhead and higher robustness of packet-pair bandwidth estimation methods (each packet size is the same) are achieved. Hence, unlike the prior art method, the present invention provides better bandwidth utilization at the time of transmission, as multiple frames can be transmitted in the same packet.

As multimedia data is memory intensive, such data requires large amounts of memory for storage and use by a computer system. Thus, storing transmitted data in server's local memory can be expensive and can limit the ability to provide such data for retransmission. To reduce the memory requirements when working with this type of data, the inventive scheme is provided so that less storage space is needed to store retransmission information and a better utilization of bandwidth can be realized. The implementation of the retransmission of packets requested by the client 14 during a real-time packetization application is explained hereinafter.

As mentioned earlier, the difficulty of retransmitting packets requested by the client 14 in a real-time packetization process stems from the fact that the server 12 has no way of reconstructing the header information from a sequence number contained in the received NACK packet; nor is this information stored in the meta-file as this information is unknown in advance, because the server 12 randomly decides the composition of each packet dynamically at the time of transmission. According to the present invention, as the server 12 knows the composition of each packet only after it has transmitted the packet to the client 14, the server 12 is provided with a local memory (i.e., RAM) to keep the dynamic values of each packet for a predetermined time period. Hence, in the event that the retransmission of a packet is needed, the server can retrieve the necessary packet from the local memory.

Figure 5:
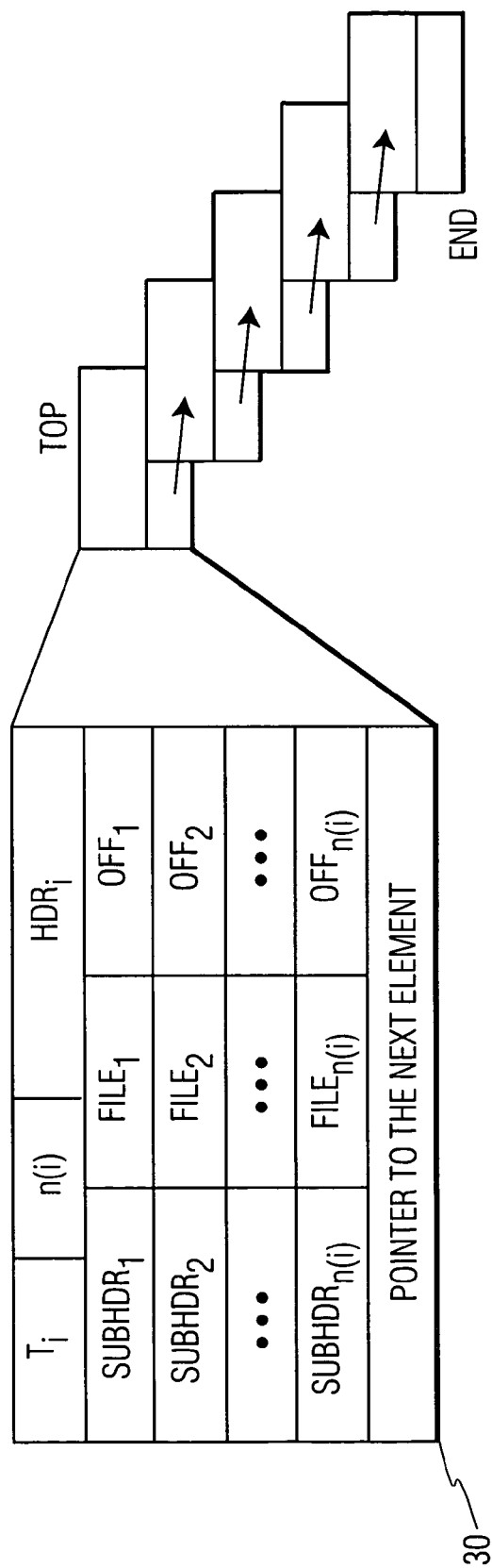
FIG. 5 illustrates the structure of a retransmission list according to the present invention.

As shown in FIG. 5, after the transmission of packet i, the server 12 will include the following information into its local linked retransmission list 30: (1) the transmission time $T_i$ representing the time of the local clock when the server 12 transmitted packet i; (2) the number of subpackets n(i) in packet i; (3) the entire streaming header of packet i, termed $HDR_i$; (4) all subheaders within packet i (i.e., all n(i) subheaders $SubHdr_1 \ldots SubHdr_{n(i)}$), which are added to the list element 30; (5) a unique identifier of the file, $FILE_1 \ldots FILE_{n(i)}$, for each subpacket where the subpacket can be found—this could be a file pointer, a file number, object number, object layer number, or any other index that uniquely identifies the file in which subpacket data can be found; and, (6) the offset within the corresponding file where the data can be found for each subpacket, $OFF_1 \ldots OFF_{n(i)}$. All of these six elements are provided within the linked list 30, and the elements are inserted at the end of the list 30 and removed from the top of the list 30. For consecutively transmitted packets, the list 30 may be consecutive and copies of transmitted packet headers (or packets themselves) are stored in a memory at the server 12 to facilitate retransmission (in the case of a live video source, entire packets rather than headers are stored in the linked list). The size of the memory is predetermined and depends on the round trip delay and the intended number of retransmission attempts.

According to the present invention, lost packets are recovered by constructing the lost packet using the elements of the linked list and the corresponding disk video files (disk files are inapplicable in cases of live sources). As a key part of this invention, retransmission decisions are based on the duration of dynamic packet information stored in the memory. For simplicity, the lifetime (i.e., maximum hold time) of each packet's header information at time t is called MH(t). In the embodiment of the present invention, the duration of keeping dynamic packets at the server 12 is determined by the client 14 (explained later) based at least on the predetermined delay budget and the estimated round-trip delay in the packet network. The determined duration MH(t) is then forwarded back to the server 12 by the client 14. A key aspect of the present invention is the method of determining how long the copies of packets stored in the server 12 should be maintained for retransmission purposes.

To support the communication of the value of MH from the client 14 to the server 12, the present invention utilizes three message types that are sent by the client 14 to the server 12. The first message type (MSG_STREAM) is used to initiate the streaming which is present in all streaming protocols. The second message type, MSG_NACK, is a regular NACK request for retransmission. NACK messages are also present in all NACK-based applications. The third message type, MSG_ALIVE, is a keep-alive message that is sent by the client 14 to the server 12 every $T_\alpha$ seconds to indicate that the client 14 has not crashed and still maintains connectivity with the server. The recommended values of $T_\alpha$ are between 10 and 60 seconds. In the present invention, the server 12 uses the latest received value of MH following the receipt of the corresponding client packet via any above messages.

Hereinafter, a detailed description of the exemplary embodiment of the present invention for supporting real-time packetization and retransmission of lost packet is provided.

Figure 6:
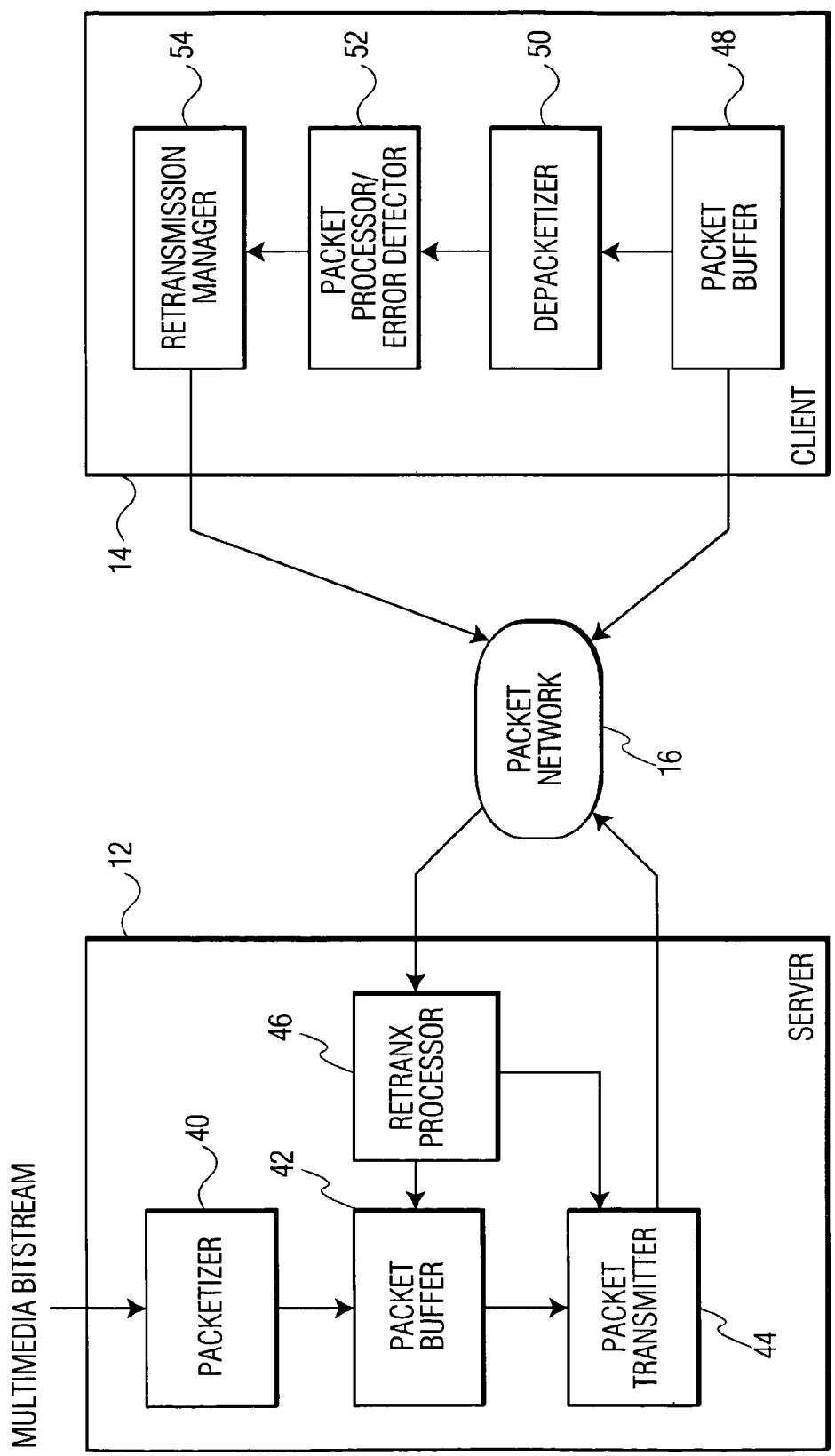
FIG. 6 illustrates a system according to an embodiment of the present invention; and, FIG. 7 is a flow chart illustrating the steps of operation according to the present invention.

An embodiment of the invention can be implemented as a computer software in the form of a computer-readable program code executed on a general purpose computer such as the server system 12 and the client system 14, illustrated in FIG. 6. This particular embodiment of the present invention, shown in FIG. 6, produces a coded multimedia bitstream and encapsulates the coded multimedia bitstream in packets of a transport protocol then transmits the resulting transport protocol packets over a packet network 16. To this end, the server system 12 executes a program to encode input data signals and segments the coded multimedia bitstream into packets of a given transport protocol for transmission. To achieve this, the server system 12 includes a packetizer 40, a packet buffer 42, a packet transmitter 44, and a retransmission processor 46, all coupled to a bi-directional system bus (not shown) along with CPU (not shown). The server system 12 provides a two-way data communication coupling via a packet network 16 to the client system 14. Wireless links are also possible. In any such implementation, the server system 12 sends and receives electrical, electromagnetic, or optical signals, which carry digital data streams representing various types of information. It should be noted that the computer systems described above are for purposes of example only. For simplicity and clarity, well-known devices, circuits, and methods relating to this type of systems are omitted. Hence, the embodiment of the present invention may be implemented in any type of computer system or programming or processing environment.

Referring back to FIG. 6, the server system 12 packetizes incoming multimedia bitstreams using the packetizer 40. The packet buffer 14, i.e., a random access memory (RAM) or other dynamic storage device, is operably coupled to the output of the packetizer 40 for storing a sequence of packets and instructions to be executed by the CPU (not shown) of the server system 12. The packet buffer 42 also may be used for storing temporary variables or other intermediate information during the execution of instructions by the retransmission processor 46. The retransmission processor 46 is operably coupled to the packet buffer and is utilized for ordering the transmission of a lost packet from the packet buffer 42. The packet transmitter 44 transmits the dynamic packets 20 stored in the packet buffer 42 to the client 14.

Referring to FIG. 6, the client system 14 includes a packet buffer 48, depacketizer 50, packet processor/error detector 52, and retransmission manager 54. The packet transmitter 44 retrieves packets from the packet buffer 42 in the sequence and transmits them to the packet network 16 at the same streaming rate as the packets are generated. Each packet forwarded by the server system 12 is received by the packet buffer 48, and, depending on the type of encoding, the depacketizer 50 assembles the incoming packets into a continuous byte stream. To accomplish this, the packet processor 52 extracts the sequence number of each packet and determines whether or not packets have arrived in sequence. Once a packet loss is detected, the packet processor 52 informs the retransmission manager 54 which packet has been lost. The retransmission manager 54, which is operably coupled to the packet processor 52 for receiving the information on lost packets, then forwards control messages to the retransmission processor 46 of the server system 12. One type of this control message is a "retransmission request," which tells the server system 12 the identity of the lost packet and the number of copies requested for retransmission. Thereafter, the retransmission processor 46 retrieves and retransmits the requested packet, which is stored by the packet buffer 42.

Figure 7:
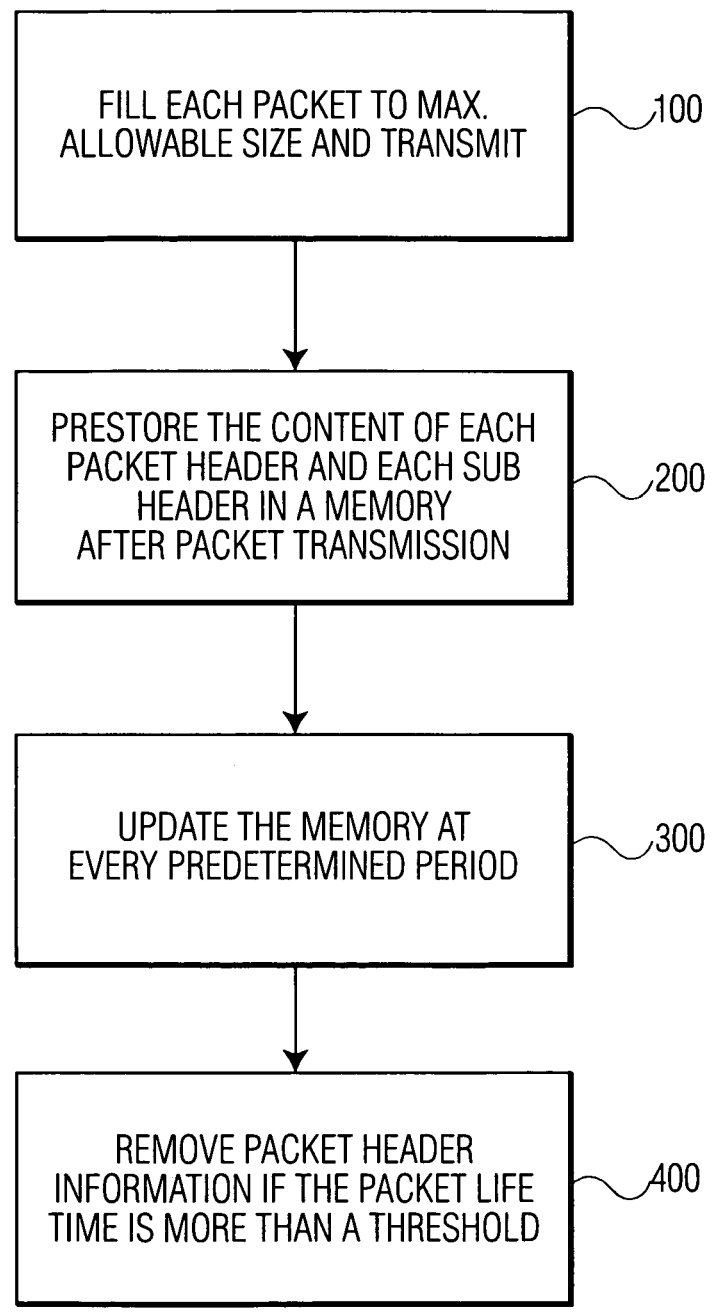

FIG. 7 is a flow chart illustrating steps in realizing real-time multimedia streaming and retransmission in accordance with the present invention. In step 100, the server 12 receives multimedia data and packetizes various types of data from different layers into appropriate size units for transmission, as shown in FIG. 4. In step 200, after the packet transmission, the content of each packet header and each subheader is stored in a linked retransmission list 30 for a predetermined period in a memory medium. Thereafter, if a request for retransmission is received from the client 14, the server 12 retrieves the appropriate packet based on the stored packet header and subheader information and retransmits the whole packet to the client 14. Meanwhile, in step 300, the client determines a threshold time period, MH(t), that is used to update the content of the memory.

In step 400, the removal process is executed in the following manner. For each element in the linked retransmission list 30, the age of each element i is examined and compared to the value of the maximum hold MH(t) determined by the client 14, where t is the current time. If the age of element i, i.e., $(t-T_i)$, where $T_i$ is the time when element i was placed into the linked list, is greater than MH(t), then item i from the linked retransmission list 30 is removed to free its memory, and the server continues to the next element. Otherwise, the removal process is terminated. After each packet is transmitted and added to the linked retransmission list 30, the server 12 goes over the retransmission list 30 either every T seconds, or every N transmitted packets (whichever method the server 12 decides to use) and removes the elements with "expired" timestamps. Here, recommended values of T are between 100 ms and 10 seconds, and the recommended values of N are between 1 and 100. If the server 12 encounters idle periods during the transmission of packets (such as between the bursts), the removal of old elements in the retransmission list 30 also may be performed during such idle periods.

The computation of MH(t) executed by the client 14 is explained hereinafter. The linked retransmission list 30 requires a certain amount of server memory for each session that the server 12 is involved. If the retransmission list 30 is too short, many NACKs will indicate packets that have already been removed from the list 30 and thus the server 12 will fail to supply the needed retransmission. This in turn will lead to underflow events and the poor quality of multimedia content at the client 14. Simultaneously, minimizing the number of elements in the retransmission list 30 during each session is highly desirable. Hence, making the retransmission 30 list too long or too short leads to negative consequences.

According to the present invention, the server 12 always uses the latest received value of MH as the current value of MH(t) at any time t following the receipt of the corresponding client packet. Here, the MSG_STREAM, MSG_NACK, or MSG_ALIVE packet carries the value of MH, which is calculated by the client 14 as follows:

$$MH = [\forall i : \max\{GOP_i + MD_i + D_{budget}\}] + RTT_0, \quad (1)$$

Typically, the multimedia stream is composed of several layers. Layers can belong to different types of media (video, audio, text, etc.), and there may be several layers for any type of media. In equation (1), $GOP_i$ is the GOP (Group of Pictures) length (in time units) of layer i (for media that do not support GOPs, $GOP_i$ is the duration of a single frame or access unit). $MD_i$ is the maximum decoding delay of layer i. This value is determined by either analyzing the existing video stream and computing the maximum time any single frame spends in the decoder buffer, or by constraining a (possibly real-time) encoder to a certain buffer model that guarantees that the actual decoding delay will not exceed MD$_i$. D$_{budget}$ is the value of an additional startup delay that the 1 to introduce after the ideal startup delay. In video streaming, the client must wait a certain amount of time before decoding each layer. This time is called the ideal startup delay of the layer.

RTT$_0$ is the initial estimate of the round-trip delay. RTT$_0$ may be based on the server's response time to the MSG_STREAM packet or a fixed value. In the latter case, the recommended values are between 2 and 15 seconds. MH should be interpreted as the maximum amount of time that the client 14 will persist recovering any single lost packet plus the initial estimate of the round-trip delay. The round-trip delay is added to the formula, because the recovery of a lost packet from the server's point of view may persist RTT$_0$ time units longer due to frequent one-way delays.

The same value of MH given by (1) is carried in all MSG_NACK and MSG_ALIVE packets until the delay associated with D$_{budget}$ has elapsed (see below). Due to a long one-way delay jitter, it may take longer than the D$_{budget}$ time units for the client to receive all necessary bits associated with the delay budget. Consequently, the actual delay budget introduced by the client for layer i is called ADB$_i$ and may be longer than the target value of D$_{budget}$. Once the delay budget has elapsed (explained further below) and the decoding of the stream begins, all MSG_NACK and MSG_ALIVE packets carry the following value of MH:

$$MH=[\forall i:\max\{GOP_i+MD_i+ADB_i\}]+RTT_{last} \quad (2)$$

where RTT$_{last}$ is the latest estimate of the round-trip delay.

Next, the computation of ADB$_i$ is explained. Suppose the first packet of layer i is received by the client 14 at time TF$_i$. In the present invention, the client 14 must receive P$_i$ bits from layer i before it will start decoding the stream:

$$P_i=(IS_i+D_{budget})\cdot r_i \quad (3),$$

where $r_i$ is the ideal video rate of layer i, and IS$_i$ is the ideal startup delay of layer i. In the prior art, the client 14 waited for exactly (IS$_i$+D$_{budget}$) time units after receiving the first packet from layer i and then signaled layer i's readiness. However, due to a long network delay jitter, it is possible that not all necessary bits will be in the decoder buffer by that time. Hence, the inventive method allows a greater variation in the one-way delay and remains more robust when employed over networks with unpredictable delays such as the Internet.

Given the above definition of P$_i$, layer i signals its readiness when all P$_i$ bits of layer i have been received by the client. Finally, suppose that TE is the time when all layers signal readiness. Hence, for each layer i, the actual delay budget is computed as:

$$ADB_i=TE-TF_i-IS_i. \quad (4)$$

At time TE that decoding the stream begins, the client 14 recomputes the value of MH according to (2), and sends it to the server. The client 14 keeps updating the value of MH in (2) as new samples of the RTT become available. Consequently, all new NACKs and keep-alive messages carry the latest MH with the updated RTT$_{last}$.

In summary, the present invention provides a new mechanism for real-time streaming of a multimedia file stored in a remote server 12 over a packet network to a multimedia client. The present invention achieves significant performance improvements when employed in NACK-based protocols. Having thus described a preferred embodiment for managing retransmission over a digital communications link, it should be apparent to those skilled in the art that certain advantages of the system have been achieved. The foregoing is to be constructed as only being an illustrative embodiment of this invention. Thus, persons skilled in the art can easily conceive of alternative arrangements providing a function similar to this embodiment without any deviation from the fundamental principles or the scope of this invention.

What is claimed:

1. A method for transmitting a multimedia bitstream in real-time between a server and a client over a packet network, the method comprising the steps of: (a) packetizing said multimedia bitstreams into a plurality of packets comprised of layers according to a predetermined scheme; (b) storing copies of the plurality of packets for a predetermined time period, which is updated by the client; (c) transmitting said stored packets in sequence to said client; and, (d) sending retransmission requests to said server, wherein said retransmission requests are sent upon the detection of a lost packet, wherein said predetermined time period is based on an equation of the form:

$$MH=[\forall i:\max\{GOP_i+MD_i+ADB_i\}]+RTT_{last}$$

where GOP$_i$ is Group of Pictures (GOP) length of layer i, MD$_i$ is the maximum decoding delay of layer i, ADB$_i$ is an actual delay introduced by said client system for layer i, and, RTT$_{last}$ is the latest estimate of the round-trip delay between said client system and said server system.

2. The method of claim 1, further comprising the step of retransmitting copies of lost packets to said client system.

3. The method of claim 1, further comprising the step of removing copies of the plurality of said packets if the lifetime of one of said packets is greater than said predetermined time period.

4. The method of claim 1, wherein said ADB$_i$ is computed based on the following relationship:

$$ADB_i=TE-TF_i-IS_i$$

where TE is the time when all layers signal readiness, TF$_i$ is the first packet of layer i received in said client system, and IS$_i$ is the ideal startup delay of layer i.

5. A method for supporting the real-time transmission and retransmission of a multimedia bitstream between a server and a client, the method comprising the steps of: (a) receiving said multimedia bitstream; (b) transforming said multimedia bitstream into a plurality of packets having prefixes; (c) adding said packet prefixes in sequence to a list controlled by said server for a predetermined time period, which is updated by the client; (d) forwarding the plurality of said packets from said server to said client; (e) searching said list for the prefix corresponding to a lost packet upon receiving a message to retransmit said lost packet from said client; and, (f) transmitting said searched packet to said client, wherein said predetermined time period is based on an equation of the form:

$$MH=[\forall i:\max\{GOP_i+MD_i+ADB_i\}]+RTT_{last}$$

where GOP$_i$ is Group of Pictures (GOP) length of layer i, MD$_i$ is the maximum decoding delay of layer i, ADB$_i$ is an actual delay introduced by said client system for layer i, and, RTT$_{last}$ is the latest estimate of the round-trip delay between said client system and said server system.

6. The method of claim 5, further comprising the step of assembling the plurality of said packets into a continuous bitstream.

7. The method of claim 5, further comprising the step of determining whether one of said packets is lost based on said packet prefixes received by said client.

8. The method of claim 5, wherein said $ADB_i$ is computed based on the following relationship:

$$ADB_i = TE - TF_i - IS_i$$

where TE is the time when all layers signal readiness, $TF_i$ is the first packet of layer i received in said client system, and $IS_i$ is the ideal startup delay of layer i.

9. The method of claim 5, wherein said searched packet is transmitted to said client by way of a Real-Time Transport Protocol.

10. A client system for receiving a multimedia file in real-time from a remote buffer from a server system, said client system and said server system being connected to a packet network, said client system comprising: a packet buffer operably coupled to store incoming packets comprised of layers sent by said server system; a depacketizer for assembling said incoming packets into a continuous bitstream; a packet processor operably coupled to said depacketizer for detecting lost packets; a retransmission manager operably coupled to said packet processor for sending retransmission requests to said server system upon detection of said lost packets, and means for computing a presentation time for copies of said incoming packets in said remote buffer and providing the presentation time to the server system, wherein said presentation time is based on the following relationship:

$$MH = [\forall i : \max\{GOP_i + MD_i + ADB_i\}] + RTT_{last}$$

where $GOP_i$ is Group of Pictures (GOP) length of layer i, $MD_i$ is the maximum decoding delay of layer i, $ADB_i$ is actual delay introduced by said client system for layer i, and, $RTT_{last}$ is the latest estimate of the round-trip delay between said client system and said server system.

11. The client system of claim 10 wherein said $ADB_i$ is computed based on the following relationship:

$$ADB_i = TE - TF_i - IS_i$$

where TE is the time when all layers signal readiness, $TF_i$ is the first packet of layer i received in said client system, and $IS_i$ is the ideal startup delay of layer i.

12. A server system for transmitting a multimedia file stored in said server to a client system, said client system and said server system being connected to a packet network, said server system comprising: a packetizer for packetizing incoming multimedia bitstrems into a plurality of packets comprised of layers according to a predetermined scheme; a packet buffer operably coupled to said packetizer for storing copies of the plurality of packets for a predetermined time period, which is determined by said client system; a packet transmitter operably coupled to the packet buffer for transmitting said stored packets in sequence to said client system; and, a retransmission processor operably coupled to said packet buffer and said packet transmitter for retransmitting copies of lost packets to said client system, wherein said predetermined time period is based on the following relationship:

$$MH = [\forall i : \max\{GOP_i + MD_i + ADB_i\}] + RTT_{last}$$

where $GOP_i$ is Group of Pictures (GOP) length of layer i, $MD_i$ is the maximum decoding delay of layer i, $ADB_i$ is actual delay introduced by said client system for layer i, and, $RTT_{last}$ is the latest estimate of the round-trip delay between said client system and said server system.

13. The server system of claim 12, wherein said retransmission processor removes copies of the plurality of said packets if the lifetime of one of said packets is greater than said predetermined time period.

14. The server system of claim 12, wherein said $ADB_i$ is computed based on the following relationship:

$$ADB_i = TE - TF_i - IS_i$$

where TE is the time when all layers signal readiness, $TF_i$ is the first packet of layer i received in said client system, and $IS_i$ is the ideal startup delay of layer i.

15. A system for streaming real-time multimedia information from a server to a client over a packet network, consisting of: (a) said server for providing a multimedia bitstream by streaming the real-time multimedia information and performing retransmission, said server comprising: a packetizer for converting said multimedia bitstream into a plurality of transmission packets comprised of layers; a packet buffer for storing said transmission packets for a predetermined time period, which is determined by the client; a packet transmitter for transmitting said transmission packets; a retransmission processor for initiating retransmission of copies of said packets upon receipt of a retransmission request from said client; (b) said client comprising: a packet buffer for storing said packets of said multimedia stream received from said server; a depacketizer for assembling said transmission packets into a continuous bitstream; a packet processor operably coupled to said depacketizer for detecting lost packets; and, a retransmission manager operably coupled to said packet processor for sending said retransmission request to said server system upon detection of said lost packets, wherein said predetermined time period is based on the following relationship:

$$MH = [\forall i : \max\{GOP_i + MD_i + ADB_i\}] + RTT_{last}$$

where $GOP_i$ is Group of Pictures (GOP) length of layer i, $MD_i$ is the maximum decoding delay of layer i, $ADB_i$ is actual delay introduced by said client system for layer i, and, $RTT_{last}$ is the latest estimate of the round-trip delay between said client system and said server system.

16. The system of claim 15, wherein said retransmission processor removes copies of the plurality of said packets if the lifetime of one of said transmission packets is greater than said predetermined time period.

17. The system of claim 15, wherein said $ADB_i$ is computed based on the following relationship:

$$ADB_i = TE - TF_i - IS_i$$

where TE is the time when all layers signal readiness, $TF_i$ is the first packet of layer i received in said client system, and $IS_i$ is the ideal startup delay of layer i.

\* \* \* \* \*